United States Patent [19]

Nasyrov et al.

[11] 3,984,521

[45] Oct. 5, 1976

[54] METHOD OF PRODUCING ALUMINA AND POTASSIUM SULPHATE FROM ALUNITE

[76] Inventors: Gakif Zakirovich Nasyrov, prospekt Nauki, 12, kv. 49; Alexandr Vladimirovich Bogdanov, Zanevsky prospekt, 31, kv. 13; Nikolai Ivanovich Eremin, prospekt Elizarova, 20, kv. 28, all of, Leningrad; Boris Alexandrovich Stolyar, prospekt Shaumyana, 37; Ivan Terentievich Yamin, Krainaya ulitsa, 13, kv. 18, both of, Kirovabad, all of U.S.S.R.

[22] Filed: Apr. 7, 1975

[21] Appl. No.: 565,788

Related U.S. Application Data

[63] Continuation of Ser. No. 420,900, Dec. 3, 1973, abandoned.

[52] U.S. Cl. .............................. 423/120; 423/127; 423/131; 423/551; 423/629
[51] Int. Cl.$^2$ .................... C01F 7/06; C01D 5/06
[58] Field of Search ............ 423/119, 120, 121, 127, 423/130, 551, 625, 629, 630, 131, 199

[56] References Cited
UNITED STATES PATENTS

| | | | |
|---|---|---|---|
| 1,070,324 | 8/1913 | Chappell | 423/551 |
| 1,971,319 | 8/1934 | Wildman | 423/127 |
| 2,099,360 | 11/1937 | Yowemura et al. | 423/120 |
| 2,527,723 | 10/1950 | Hansgug | 423/629 |
| 2,657,115 | 10/1975 | Ashley | 423/629 |
| 3,101,251 | 8/1963 | Howell | 423/118 |
| 3,401,009 | 9/1968 | Giltos | 423/121 |
| 3,796,789 | 3/1974 | Adams | 423/629 |

FOREIGN PATENTS OR APPLICATIONS

| | | | |
|---|---|---|---|
| 454,331 | 9/1936 | United Kingdom | 423/120 |

*Primary Examiner*—Oscar R. Vertiz
*Assistant Examiner*—Gary P. Straub
*Attorney, Agent, or Firm*—Holman & Stern

[57] ABSTRACT

A method for processing alunite consisting in that alunite ore is treated with a solution of caustic alkalis at a maximum temperature of 60°C, and a solid residue resulting from the above operation and containing largely potassium and sodium sulphates, is washed with hot water. As a result, potassium and sodium sulphates are dissolved in the wash water, and potassium sulphate is isolated by the action of a caustic-potash solution. The method enables losses of alkalis and aluminium during processing alunite ores containing active forms of silicon compounds to be much reduced, which compound when treating alunite ores with a solution of caustic alkalis, are liable to form insoluble aluminosilicates which are discarded into slime and thus lost together therewith when the latter is separated from the process solution.

4 Claims, No Drawings

METHOD OF PRODUCING ALUMINA AND POTASSIUM SULPHATE FROM ALUNITE

This is a continuation of application Ser. No. 420,900 filed Dec. 3, 1973, now abandoned.

BACKGROUND OF THE INVENTION

This invention relates in general to alunite processing techniques and in particular to methods of producing alumina potassium sulphate from alunite.

The method of the invention is particularly applicable for processing alunite ores the rubbish content of which contains active forms of silicon compounds.

As it is commonly known, when alunite ores are treated with a solution of caustic alkalis the silicon compounds mentioned above are liable to form alkali-insoluble aluminosilicates which are discarded into slime and lost as waste. This adds to the loss of alkalis and aluminium and, accordingly, reduces the yield of alumina won from alunite.

In widespread use at the present is a method of producing alumina and potassium sulphate from alunite ores, involving the following steps: treating alunite ore, either crude or preliminarily roasted, with a solution of caustic alkalis at 85° to 95°C until aluminates and potassium and sodium sulphates are formed in the solution; separation of slime from the solution as a solid residue; evaporation of the solution until there is precipitation of a mixture of potassium and sodium sulphates; separation of the precipitate from the solution containing mainly sodium and potassium aluminates; treating the precipitated sulphates with a caustic potassium solution to form potassium sulphate; hydrolytic decomposition of sodium and potassium aluminates in the solution until aluminium hydroxide is formed; and the production of alumina by roasting aluminium hydroxide.

The cardinal disadvantage inherent in the known method is the aforementioned loss of alkalis and aluminium due to the formation of alkali-insoluble aluminosilicates discardable along with slime. As practical experience has shown, depending upon the amount of active forms of silicon compounds contained in alunite ores, the losses of alumina in slime amounts to as high as 15–20 percent of the total $Al_2O_3$ content in the ore, and those of alkalis, to 150 kg per metric ton of commercial alumina.

SUMMARY OF THE INVENTION

It is a primary object of the present invention to provide a method producing alumina and potassium sulphate from alunite with minimum loss of the main product by being discarded into slime, i.e., and to maximize the yield of alumina and potassium sulphate even when the alunite ore contains a large proportion of the active forms of silicon compounds.

It is a practical object of the present invention to reduce, as much as possible, the formation of aluminosilicates accompanying the treatment of alunite ores with a solution of caustic alkalis, due to the lowered activity of silicon compounds contained in alunite ores.

These and other objects are attained by method of producing alumina and potassium sulphate from alunite by treating the latter with a solution of caustic alkalis, followed by a separate isolation of alumina and potassium sulphate. According to the invention, alunite is treated with a solution of caustic alkalis at a maximum temperature of 60°C, the solid residue resulting from the alunite treatment, being washed with water to isolate potassium and sodium sulphates therefrom, and caustic potash is added to the wash water to isolate potassium sulphate therefrom.

This reduces the activity of silicon compounds to such an extent that their interaction with potassium and sodium aluminates is practically eliminated.

In order to minimize the transition of potassium and sodium sulphates into solution when treating alunite with a solution of caustic alkalis and thus have largely the solution of potassium and sodium aluminates, alunite is treated with a solution of caustic alkalis having a minimum concentration of 120 g/l of caustic $Na_2O$. To provide complete extraction of potassium and sodium sulphates from the solid residue resulting from alunite treatment with a solution of caustic alkalis at a minimum practicable flow rate of wash water, it is preferable that the solid residue be washed with water at a minimum temperature of 90°C.

To attain maximum isolation of potassium sulphate from a mixture of potassium and sodium sulphates contained in wash water, with a minimum practicable degree of evaporation of the latter, the potassium-sulphate isolation process expediently occurs under the effect of caustic potash at 30 to 40°C.

DETAILED DESCRIPTION OF PREFERRED EMBODIMENTS

A detailed disclosure is given below of the invention by way of illustration in a number of practical embodiment of the method thereof.

Alunite ore with any content of alunite therein and of active forms of silicon compounds in its waste products, is suitable for treatment. Alunite ore is first subjected to crushing in any arrangements suitable for the purpose.

The crushed alunite ore is then ground in any known bail or rod mill. While being ground the alunite ore is treated with a solution of caustic alkalis for example potassium hydroxide and sodium hydroxide at 40° to 60°C.

The process may be conducted at a temperature below 40°C but this is not economically justified, mainly due to the fact that the process of rendering the aluminium oxide contained in the alunite ore into solution, proceeds with low intensity.

The fact that alunite is treated with a solution of caustic alkalis at a maximum temperature of 60°C enables $Al_2O_3$ contained in the alunite ore, to be rendered into solution as aluminates with but minimized inescapable losses of aluminium and alkalis as a result of avoiding the formation of aluminosilicates. The concentration of caustic alkalis in a solution used for treating the alunite ore, ranges from 120 to 200 g/l in terms of caustic $Na_2O$.

With the concentration of an alkaline solution falling within this range, optimum conditions are ensured for the entire alunite processing procedure, viz., minimum dissolution of potassium and sodium sulphates from the alunite and improved conditions for further hydrolytic decomposition of the solution of sodium and potassium aluminates.

As a result of treatment of the alunite ore with a solution of caustic alkalis under the afore-specified temperatures and concentrations of alkaline solution, a solution results which contains largely potassium and sodium aluminates, as well as a solid residue, containing potassium and sodium sulphates and also waste products (slime).

The solid residue is filter-separated from the solution.

The solution of potassium and sodium aluminates undergoes purification from silica by being crystallized out as aluminosilicates when stirred in the presence of aluminosilicate crystals as crystallization nuclei. The process occurs at 65 to 100°C, the higher the temperature the more intensive the crystallization process of aluminosilicates.

Further alumina production process is conducted by the heretofore known techniques, viz., by a hydrolytic decomposition of the solution of sodium and potassium aluminates until the formation of aluminium hydroxide as a precipitate, followed by filtering out the precipitate and roasting the precipitate to obtain commercial alumina.

Solid residue containing potassium and sodium sulphates and waste products, are treated with wash water in known stirring vats at an elevated temperature which is desirably to be not below 90°C. The result is that potassium and sodium sulphates are practically rendered completely into solution during a 20–30-minute treatment with wash water. The solution is then filtered out from the slime, and the filtered solution is evaporated to such an extent that a further introduction of a caustic-potash solution therein the concentration of a caustic alkali in the solution be not less than 180 to 200 g/l in terms of caustic $Na_2O$. Thereupon, a caustic-potash solution is introduced into the thus-evaporated solution of potassium and sodium sulphates, and this solution is cooled down to 30–40°C. The result is the precipitation of potassium sulphate, said precipitate is filtered out and dried.

The alkaline solutions remaining upon hydrolytic decomposition of the solution of potassium and sodium aluminates and upon the isolation of potassium sulphate by virtue of caustic potash, are recovered from wash water and reused for treatment of the next batch of alunite ore.

It is not necessary, as far as the present invention is concerned to describe an arrangement for realization of the afore-disclosed method, since suitable for the purpose are widely known plants used in present day practice to produce alumina and potassium sulphate by currently employed methods.

A number of exemplary embodiments of the method of the invention are now set forth.

EXAMPLE 1

One metric ton of alunite ore was subjected to treatment having an alunite content of about 55 percent and 20 percent content of the active forms of silicon compounds, such as kaolinite, opal and chalcedony, as in terms of $SiO_2$.

The alunite ore was treated with a solution of caustic alkalis at 50°C, the concentration of caustic alkali in the solution being 150 g/l in terms of caustic $Na_2O$. The solid residue resulting from the treatment of the alunite ore with a solution of caustic alkalis under the afore-specified conditions, was washed at 90° to 100°C, while the wash water was treated with a caustic-potash solution to isolate potassium sulphate, at 30° to 40°C.

As a result the yield was as follows: alumina, 190 kg; potassium sulphate, 440 kg; losses of $Al_2O_3$ and alkalis rendered into slime being respectively 10 kg and 4 kg, or 5 percent and 10 percent of the content of aluminium oxide and potassium and sodium sulphates in the original alunite ore.

EXAMPLE 2

One metric ton of alunite ore was treated as in Example 1 but with a 5-percent content of the active forms of silicon compounds, viz., kaolinite, opal and chalcedony, as in terms of $SiO_2$, all other conditions being the same as in Example 1.

As a result there was obtained: alumina, 194 kg; potassium sulphate, 450 kg; the losses of $Al_2O_3$ and alkalis waisted in slime being respectively 6 kg and 2 kg, or 3 percent and 5 percent of the content of $Al_2O_3$ and $K_2SO_4$, $Na_2SO_4$ in the original alunite ore.

EXAMPLE 3

Alunite ore in an amount as in Example 2 was provided.

Treatment with a solution of caustic alkalis was conducted at 60°C and a concentration of a caustic alkali in the solution equal to 120 g/l in terms of caustic $Na_2O$.

All other conditions are similar to those in Example 1.

There was obtained: alumina, 192 kg, potassium sulphate, 442 kg while the losses of $Al_2O_3$ and alkalis with slime were respectively 8 kg and 3.5 kg, or 4 and 8 percent, respectively.

EXAMPLE 4

An amount of alunite ore similar to that used as in Example 1 was provided for treatment.

Treatment with a solution of caustic alkali was conducted at 40°C and a concentration of a caustic alkali in the solution equal to 180 g/l, other conditions being the same as in Example 1.

Obtained: alumina, 192 kg, potassium sulphate 440 kg, while the respective losses of $Al_2O_3$ and alkalis were 8 kg and 4 kg, or 4 and 10 percent, respectively.

What is claimed is:

1. A method of producing alumina and potassium sulphate from alunite, comprising the steps of: treating the alunite ore with a solution of potassium hydroxide and sodium hydroxide at a maximum temperature of 60°C to produce a solution containing potassium and sodium aluminates and a solid residue containing potassium and sodium sulphates; separating the solid residue from the solution; washing the solid residue with hot water to dissolve the potassium and sodium sulphates; introducing caustic potash into the wash water to precipitate the potassium sulphate therefrom; separating the potassium-sulphate precipitate from the wash water; purifying the solution containing potassium and sodium aluminates, from aluminosilicates by crystallizing said aluminosilicates out from the solution; hydrolytically decomposing the solution free from aluminosilicates and containing sodium and potassium aluminates until formation of an aluminium hydroxide precipitate; and roasting the aluminium hydroxide to obtain alumina.

2. The method as claimed in claim 1, wherein the alunite ore is treated with a solution of potassium hydroxide and sodium hydroxide having a minimum concentration of 120 g/l in terms of caustic $Na_2O$.

3. The method as claimed in claim 1, wherein the solid residue resulting from the treatment of alunite with a solution of potassium hydroxide and sodium hydroxide, is washed at a minimum temperature of 90°C.

4. The method as claimed in claim 1, wherein a caustic-potash solution is introduced into the wash water to isolate potassium sulphate therefrom at a temperature of 30° to 40°C.

* * * * *